United States Patent Office 3,502,719
Patented Mar. 24, 1970

3,502,719
PREPARATION OF METHACRYLAMIDE SULFATE
Gunter Schroder, Ober Ramstadt-Eiche, and Herbert Fink, Bickenbach, Germany, assignors to Rohm & Haas G.m.b.H., Darmstadt, Germany
No Drawing. Filed Sept. 26, 1966, Ser. No. 581,758
Claims priority, application Germany, Oct. 2, 1965, R 41,675
Int. Cl. C07c 103/12, 103/08, 103/00
U.S. Cl. 260—561                    2 Claims

ABSTRACT OF THE DISCLOSURE

A process for producing methacrylamide sulfate is provided which comprises heating concentrated sulfuric acid and acetone cyanohydrin in a closed reaction zone at temperatures between 120° C. and 160° C. in the presence of carbon monoxide at a partial pressure between one and twenty-five atmospheres. The presence of carbon monoxide increases the yield of methacrylamide. Preferably the carbon monoxide partial pressure is from ten to twenty-five atmospheres.

---

This invention relates to a process for producing methacrylamide sulfate; more specifically the invention pertains to a process for producing methacrylamide sulfate from acetone cyanohydrin and sulfuric acid in high yields achieved by a novel suppression of by-product formation.

It is known that methacrylamide sulfate can be obtained by converting acetone cyanohydrin with concentrated sulfuric acid. When this is done, care is taken that the temperature does not climb any higher than 80° C. when acetone cyanohydrin is added with stirring to the sulfuric acid. This produced, stirred mixture is then heated to 120° to 160° C. The same process is used on an industrial scale when producing methacrylic acid and its ester. In this process, carbon monoxide is produced as an undesirable and useless by-product in the conversion of acetone cyanohydrin to methacrylamide and in such amounts that it possesses, for the process, a considerable economic meaning.

When practicing the above process, proportions of the stirred acetone cyanohydrin and sulfuric acid which are from about 1:1.1 to 1:1.8 moles, as a rule, occasion losses from 7 to 12% based on acetone cyanohydrin or methacrylamide. The chemistry of the side reactions producing carbon monoxide and acetone disulfonic acid is not particularly understood; although on the basis of some experiments, it has been ascertained that carbon monoxide and acetone disulfonic acid is formed in a molar ratio of about 2 to 1, and that the carbon monoxide stems from the nitrile group of the acetone cyanohydrin.

It has now been discovered that the production of carbon monoxide can be surprisingly, strongly reversed when the partial pressure of carbon monoxide is more than one atmosphere, i.e., when the conversion of acetone cyanohydrin to methacrylamide sulfate is carried out under pressure of carbon monoxide. The formation of carbon monoxide can further be reversed when additional carbon monoxide is added to the reactants either at the beginning or during the conversion, i.e., when the carbon monoxide concentration in the reactant mixture is further increased. With especial advantage, the reaction is carried out at a carbon monoxide partial pressure of 10 to 25 atmospheres and at a conversion temperature of 130° C. Already at a starting pressure of 10 atmospheres (which is achieved by pressurizing an autoclave with carbon monoxide and which pressure climbs to 15 atmospheres after heating to a reaction temperature of 130° C.), the amount of carbon monoxide formed falls below 2% (i.e., when measured as loss of acetone cyanohydrin).

It is known that the best yields of methacrylamide sulfate are achieved by converting acetone cyanohydrin with sulfuric acid when about 100% sulfuric acid is used; while with slight amounts of water or slight amounts of sulfur trioxide in the acid, the yields are considerably impaired.

In agreement with these facts is the observation that, when working with 100% sulfuric acid under otherwise identical conditions, a similar amount of carbon monoxide is produced when the acetone cyanohydrin is stirred with either water containing sulfuric acid or fuming sulfuric acid. Although the process can be practiced with 98% to 102% sulfuric acid (the percentages over 100% indicating sulfur trioxide concentration), the preferred concentrations are those indicated herein.

At the especially advantageous conditions of the novel process, viz., when presurizing an autoclave with excess carbon monoxide, it is possible either: to proceed by introducing carbon monoxide under pressure in the stirred mixture of reactants produced under cooling which mixture is then heated to the reaction temperature; or pressurizing sulfuric acid with carbon monoxide, then while cooling and stirring, introducing acetone cyanohydrin in the acid, and thereafter heating the stirred mixture to the indicated temperature range.

When only methacrylamide results as an intermediate product in the production of methacrylic acid, or methacrylic acid esters, respectively, according to German Patent Nos. 648,237 and 649,165, the novel steps required herein are not detrimentally affected in the further conduct of the process. The basic principle of the process of the invention is applicable also to the preparation of methacrylic acid and methacrylic acid esters by reacting acetone cyanohydrin with sulfuric acid under increased carbon monoxide partial pressure without thereby reducing the yields thereof.

The examples hereinbelow illustrate a number of process alternatives and are not intended to limit to these alternatives the broader aspects of this invention. In common to all of the illustrated examples, the conversion of acetone cyanohydrin to methacrylamide takes place at a partial pressure of carbon monoxide in excess of one atmosphere.

An experiment for comparison purposes with the processes in Examples 1 to 4

2,648 grams (27 moles) of sulfuric acid (100.3% $H_2SO_4$) were introduced in a 6-liter reaction vessel equipped with a stirrer, a reflux condenser and a drop funnel. Thereafter, 1532 grams (18 moles) of acetone cyanohydrin were introduced under stirring in the reactor at a rate such that the temperature rapidly rose to 80° C., and the mixture maintained at this temperature range. The obtained mixture was then introduced in a 4-liter glass-lined autoclave preheated to 80° C. and the air in the reaction vessel driven off with carbon monoxide. Additionally, the mixture was heated within 20 minutes to 130° C., held for 30 minutes at this temperature, and thereafter cooled to 80° C.

The gas which was formed during the heating and was displaced through a relief line was measured. According to an analysis of the obtained gas, it was carbon monoxide. Altogether 30.9 liters STP (standard temperature pressure) of carbon monoxide were developed which corresponds to 7.7% of the introduced cyanohydrin being decomposed.

Example 1

The conversion of acetone cyanohydrin with sulfuric acid was repeated according to the above procedure with the distinction that after the introduction of the acetone cyanohydrin and the scrubbing of the autoclave contents with carbon monoxide, the autoclave was closed. After heating, at about 130° C. a maximum pressure of 7.9 atmospheres developed. After cooling to 80° C., the vessel was relieved and the expelled gas measured. 21.7 liters STP of carbon monoxide were expelled which correspond to 5.4% of the introduced acetone cyanohydrin being decomposed.

Example 2

The conversion of acetone cyanohydrin with sulfuric acid was repeated according to Example 1 with the distinction that after the closing of the autoclave and before the further heating thereof, the carbon monoxide was introduced therein under pressure until a pressure of 3 atmospheres over that existing in the autoclave was reached. After heating to 130° C. and cooling to 80° C., the autoclave was relieved and the carbon monoxide which was expelled was measured. The carbon dioxide which was added at 80° C. was subtracted from the total amount of the gas recovered. It was found that according to this procedure, 17.3 liters STP of carbon monoxide were additionally formed, which correspond to 4.3% of the introduced acetone cyanohydrin being decomposed.

Example 3

The conversion was repeated according to Example 2 with the distinction that the introduced carbon dioxide at 80° C. formed an excess pressure of 5 atmospheres. The carbon monoxide which was obtained by the decomposition of acetone cyanohydrin was 15.3 liters STP or 3.8% of the theoretical amount calculated on the basis of the introduced acetone cyanohydrin.

Example 4

The conversion was repeated according to Example 2 with the distinction that at 80° C., the amount of introduced carbon dioxide caused a pressure of 10 atmospheres. In this instance the maximum excess pressure at 130° C. was 15 atmospheres. The amount of carbon monoxide formed by the decomposition of hte acetone cyanohydrin was 8.2 liters STP which correspond to 2% of the theoretical amount calculated on the basis of the introduced acetone cyanohydrin.

SUMMARY OF THE COMPARISON AND EXAMPLES 1 TO 4

| Example | CO pressure 80° C. in atm. | CO excess pressure at 130° C. in atm | Formation of CO | |
|---|---|---|---|---|
| | | | Liters STP | Percent of theoretical yield on basis of acetone cyanohydrin |
| Comparison | 1 | 0 | 30.9 | 7.7 |
| Example 1 | 1 | 7.9 | 21.7 | 5.4 |
| Example 2 | 4 | 10.3 | 17.3 | 4.3 |
| Example 3 | 6 | 12.0 | 15.3 | 3.8 |
| Example 4 | 11 | 15.0 | 8.2 | 2.0 |

An experiment for purposes of comparison with respect to the process in Example 5

In a 4-liter glass-lined autoclave, 1764 grams (18 moles) sulfuric acid (100.1% $H_2SO_4$) were introduced. Under atmospheric pressure, 1020 grams (12 moles) acetone cyanohydrin were introduced dropwise at such a rate that the temperature rapidly rose to 70 to 80° C., and this temperature range further maintained during the reaction. When the total acetone cyanohydrin was introduced, the contents of the reaction vessel were scrubbed with carbon monoxide, then within 30 minutes the reactant mixture heated to 130° C., held 5 minutes at this temperature, and thereafter cooled to 80° C. The gas expelled during the heating was measured. According to the analysis of the expelled gas, it was pure carbon dioxide. Its amount was 31.2 liters STP, which correspond to 11.07% of the acetone cyanohydrin being decomposed. Next the reacted mixture was digested with a slight amount of water in order to inhibit crystallization and then neutralized with 3640 grams of a 16.85% solution of an aqueous ammonia during which, by cooling, the temperature was held between 20 to 30° C. A crystal slurry was obtained consisting of crystallized methacrylamide and a saturated aqueous solution of ammonium sulfate, still containing a slight amount of dissolved methacrylamide. The crystallized methacrylamide was filtered, dried and exhaustively extracted with benzene. By distilling the benzene from the extract, 715 grams of methacrylamide having a melting point of 109 to 110° C. were obtained which correspond to 70% of that of the theoretical yield.

The aqueous ammonium sulfate solution was evaporated to dryness and similarly the remainder exhaustively extracted with benzene. By distilling of the benzene an additional 20.9 grams of methacrylamide were obtained having a melting point of 109 to 110° C. which correspond to 2.1% of that of the theoretical yield. According to this experiment, the combined yield of methacrylamide was 72.1% of that of the theoretical yield.

Example 5

The conversion of the acetone cyanohydrin was repeated (according to the above experiment for purposes of comparison) with the distinction that at 80° C., and before further heating, carbon monoxide was introduced in the autoclave until a pressure of 5 atmospheres was obtained. The carbon monoxide, which resulted from the decomposition of the acetone cyanohydrin in this reaction was 17.7 liters STP which correspond to 6.6% of the theoretical amount of the acetone cyanohydrin being decomposed. The work-up of the reaction mixture, which corresponded to that in the above comparison, yielded 798.7 grams which correspond to 78.2% of the theoretical yield of methacrylamide of a melting point of 109 to 110° C.

What is claimed is:
1. In a process of producing methacrylamide sulfate from acetone cyanohydrin and concentrated sulfuric acid in a closed reaction zone at elevated temperatures, the improvement comprising the step of: heating a reaction mixture of acetone cyanohydrin, said sulfuric acid and carbon monoxide at a carbon monoxide partial pressure between one and twenty-five atmospheres and at a temperature between 120° C. and 160° C.

2. A process according to claim 1 wherein at 130° C. the carbon monoxide in the reaction zone is at a pressure of from 10 to 25 atmospheres.

References Cited

UNITED STATES PATENTS 2,628,977  2/1953  Grigsby _____ 260—561
2,690,454  9/1954  Strain et al. _____ 260—561

ALEX MAZEL, Primary Examiner

J. A. NARCAVAGE, Assistant Examiner